United States Patent
Thompson

(10) Patent No.: US 9,119,412 B2
(45) Date of Patent: Sep. 1, 2015

(54) REDUCED HEAVY CREAM SUBSTITUTES AND METHODS OF MAKING AND USING SAME

(75) Inventor: Jason Thompson, Robbinsdale, MN (US)

(73) Assignee: Land O'Lakes, Inc., Arden Hills, MN (US)

(*) Notice: Subject to any disclaimer, the term of this patent is extended or adjusted under 35 U.S.C. 154(b) by 55 days.

(21) Appl. No.: 13/420,363

(22) Filed: Mar. 14, 2012

(65) Prior Publication Data

US 2013/0243927 A1    Sep. 19, 2013

(51) Int. Cl.
| | |
|---|---|
| A23C 13/00 | (2006.01) |
| A23L 1/0526 | (2006.01) |
| A23L 1/054 | (2006.01) |
| A23L 1/19 | (2006.01) |
| A23C 13/14 | (2006.01) |

(52) U.S. Cl.
CPC ............. *A23L 1/0526* (2013.01); *A23L 1/0541* (2013.01); *A23L 1/19* (2013.01); *A23C 13/14* (2013.01)

(58) Field of Classification Search
CPC .... A23C 13/14; A23L 1/0526; A23L 1/0541; A23L 1/19
USPC ........................................................ 426/586
See application file for complete search history.

(56) References Cited

U.S. PATENT DOCUMENTS

| | | | |
|---|---|---|---|
| 2,376,656 A * | 5/1945 | Buchanan | 252/363.5 |
| 4,985,270 A * | 1/1991 | Singer et al. | 426/565 |
| 6,627,243 B2 * | 9/2003 | Cherian et al. | 426/586 |
| 6,759,078 B2 | 7/2004 | Stuchell | |
| 7,658,962 B2 | 2/2010 | Hussein et al. | |
| 2003/0207016 A1 | 11/2003 | Hussein | |
| 2004/0047966 A1 | 3/2004 | Hussein et al. | |
| 2005/0226985 A1 * | 10/2005 | Landon et al. | 426/581 |
| 2011/0086156 A1 | 4/2011 | Jaswal et al. | |
| 2011/0151081 A1 * | 6/2011 | Balbarie et al. | 426/324 |

FOREIGN PATENT DOCUMENTS

| | | |
|---|---|---|
| AR | 020888 | 6/2002 |
| EP | 45158 A1 * | 2/1982 |
| KR | 10-2009-0003211 | 1/2009 |
| WO | WO 00/11966 | 3/2000 |
| WO | WO 02/102174 | 12/2002 |
| WO | WO 2004/030464 | 4/2004 |

* cited by examiner

*Primary Examiner* — Michele L Jacobson
*Assistant Examiner* — Subbalakshmi Prakash
(74) *Attorney, Agent, or Firm* — Dorsey & Whitney LLP; Bridget M. Hayden, Esq.

(57) ABSTRACT

Cream products formed by dispersing gum and lactose in water prior to the addition of butter and dry ingredients, subjecting the mixture of ingredients to heating, followed by rapid cooling and shear forces, provides a stable product. The cream products may replace traditional liquid cream-based products, and instead use dry cream up to about 7.5 weight percent mixed with butter up to about 30 weight percent, gum at about 0.75 weight percent, lactose, and water forming the balance of the product. The product may form a reduced heavy cream replacer with a fat content of up to about 35 weight percent. The product includes at least one of a flavor, appearance, and texture substantially similar to that of a traditional reduced heavy cream but withstands stresses and abuses that are not tolerated by the traditional reduced heavy cream.

19 Claims, No Drawings

REDUCED HEAVY CREAM SUBSTITUTES AND METHODS OF MAKING AND USING SAME

FIELD OF THE INVENTION

Implementations provide cream products including reduced heavy cream substitutes and methods of making the cream products.

BACKGROUND

Dairy products based from liquid creams such as creams and reduced heavy creams generally have a short shelf life lasting about two weeks. For example, scratch reduced heavy cream is used in many foodservice kitchens as a base for entrees, soups, and desserts. However, reduced heavy cream production can be a time-consuming process, and the product has the aforementioned short shelf life. Creams also typically contain a high fat content with cream typically containing about 40 percent fat, and reduced heavy cream typically containing about 60 percent fat. Liquid cream-based dairy products may be difficult to handle due to the creams solidifying, e.g., forming butter, from agitation during transport. In addition, cream production costs are typically high due to the length of time and the temperature at which the creams are required to be heated during pasteurization.

SUMMARY

Implementations are directed to cream products and methods of making cream products formed of dry cream and butter that may be used as a replacement to liquid cream-based products. The products formed from the dry cream may exhibit a longer shelf life, a lower fat content, and may ship easily. In addition, the dry cream-based products include substantially the same viscosity and thickness as liquid cream-based products but withstands abuses in cooking situations that are not otherwise tolerated by traditional liquid cream-based products. Further, the cream products produced using the methods provided herein may have a high throughput. The cream products may be used as a reduced heavy cream substitute or as a base for cream sauces (e.g., alfredo sauce).

According to certain implementations, a method for producing a cream product includes mixing gum and lactose with a first portion of water for a first time period to form a gum dispersion; after the first time period, adding the gum dispersion to melted butter and a cream pre-mixture comprising dry cream in an amount of about 5 weight percent of the product and hydrated by a second portion of water thereby forming a cream mixture; heating the cream mixture; rapidly cooling and subjecting the heated cream mixture to shear forces. The gum dispersion in the cream mixture being subjected to the cooling and the shear forces forms a stable cream product containing about 35 weight percent fat.

In other implementations, a cream product with improved handling characteristics includes dry cream up to about 7.5 weight percent of the product; butter up to about 30 weight percent of the product; gum at about 0.75 weight percent of the product; lactose up to about 4 weight percent of the product; and water forming the balance of the product; wherein: fat forms up to about 35 weight percent of the product; the product comprises at least one of a flavor, appearance, and texture substantially similar to a traditional reduced heavy cream; and the product withstands stresses and abuses that are not tolerated by the traditional liquid cream-based reduced heavy creams.

DETAILED DESCRIPTION

Implementations herein provide a reduced heavy cream product that may be used in the food industry. The reduced heavy cream product may be formed using cream powder, in contrast to liquid cream, and may be used as a substitute for traditional reduced heavy cream formed from the liquid cream. The reduced heavy cream product is configured to be highly stressed in cooking situations, unlike traditional scratch or liquid cream-based reduced heavy creams, making the product advantageous for foodservice applications.

Cream Products

The cream products, according to certain implementations, may include dry cream; gums; lactose; fat (e.g., butter) and water to form a cream product with about 35 weight percent fat. Each of the components of the cream products are described further below. In addition, cream products, according to some implementations, may include proteins; emulsifiers; edible acids; preservatives; and defoamers, each of which are described further below.

Dry cream may contribute between about 2.5 weight percent and about 7.5 weight percent of the total weight of the cream product or may account for about 5 weight percent of the product. The fat content of the dry cream may be about 40 weight percent and may be derived from the milk skimming process, in which the fat separated or skimmed from milk is sprayed to form a dry cream in a powdered or particulate form. The dry cream may hydrate in the presence of water or another aqueous component to form liquid cream. In some implementations, the addition of dry cream as opposed to non-dairy cream replacements enables the cream product to be labeled with cream as the first ingredient.

The cream product may include gums such as xanthan gum, guar gum and mixtures thereof, and may account for between about 0.65 weight percent and about 0.85 weight percent or at about 0.75 weight percent of the total weight of the cream product. In one embodiment, the gum is Kelgum 87 produced by Kelco Foods. Other gums that may be used alone or in combination with xanthan gum and guar gum include arabic; locust bean gum; gum tragancanth; and carrageenan. The gums are used to form a dispersion with water in order to bind the water and provide a stable product, described below. Gums may also help provide texture and viscosity to sauces.

In addition to gums, the cream product includes lactose for adding a sugar flavoring in an amount between about 1.0 weight percent to about 4 weight percent or at about 2.5 weight percent of the total weight of the product. Lactose may be provided in powder form, and may be spray dried. Surprisingly, it has been found that mixing gums and lactose with water before mixing other components of the cream product results in a more stable product. The lactose may act to evenly disperse the gums in the water and may avoid clumping of the gums in the cream mixture and cream product, described below.

Fat in the form of butter may account for between about 10 weight percent and about 30 weight percent or about 20 weight percent of the total weight to the cream product. The butter may be in the form of salted butter. A typical composition of butter includes about 80 weight percent milk fat; about 16 weight percent water; about 0.85 weight percent protein; about 0.06 weight percent lactose; about 2.11 weight percent ash and about 1 weight percent salt. Other exemplary fat containing compositions may include vegetable oil or fat such as soybean oil; palm oil; hydrogenated oil; interesterified oil; and fractionated oil. However, in some implementations, the fat component of the cream product may be free of vegetable oils such as palm kernel oil and coconut oil.

Proteins such as whey protein concentrates; dried whey; whey protein isolates; milk protein concentrates; soy proteins; or any other form of protein-containing solids may be in an amount between about 0.5 and about 1.0 weight percent or at about 0.6 weight percent of the total weight of the cream product.

Water-soluble emulsifiers such as sodium caseinate may be added to the aqueous component to promote temperature-emulsion stability of the cream product in an amount between about 0.5 weight percent and about 2.0 weight percent or at about 1.0 weight percent of the total weight of the product. The sodium caseinate may serve to bind fat to water (e.g., stabilize the oil in water emulsion). If water-soluble emulsifiers are absent from the aqueous component, fat-soluble emulsifiers may be added to the butter or other fat containing component.

Edible acids such as citric acid may be added to control the pH and may be provided in an amount up to about 0.3 weight percent or at about 0.1 weight percent of the total weight of the cream product.

Preservatives such as, but not limited to, sodium benzoate and potassium sorbate, may be provided in an amount up to about 0.2 weight percent of total weight of the cream product.

Defoamers (e.g., food grade defoamers such as Magrabar silicone defoamer) may be added to the cream product to avoid forming a foam during the blending and agitation steps of the production methods described below.

Water may contribute between about 55 weight percent to about 80 weight percent of the total weight of the product.

In some implementations, the cream product may be free or substantially free of one or more of liquid creams, buttermilk powder, anhydrous milk fat and starch.

Methods of Making the Cream Products

To prepare the cream product, the production process may involve mixing water, gum and lactose separate from other ingredients, described below. The gum and lactose may be dry blended and the blended mixture may be incorporated into water, such as about 60 percent of the water fraction of the total weight of the product. The mixture may be continuously agitated and mixed, such as by using a liquefier (e.g., a blade mixer), to form a hydrated gum dispersion. Additionally or alternatively, the mixture may be heated to a temperature greater than 140° F. or to a temperature that facilitates incorporation of the gums into the water. The mixture of water, gums and lactose may be processed for approximately 15 to 30 minutes during which time the mixture may be heated to 140° F. and the gums may form a gel like dispersion with the water and lactose. The processing time is not limited to 15 to 30 minutes, and instead may be for a time to effectively cause the gums to be incorporated into the water. For example, gums and lactose may form a gel dispersion with the water after about 3 to 4 minutes. Surprisingly, it has been found that the lactose blended with the gums prior to mixing with other dry ingredients and butter facilitates dispersing the gum more evenly in the water and avoids clumping of the gums. The lactose may break up the gums for incorporation into the water. The lactose may thereby facilitate providing evenly dispersed gums at their full water binding capacity.

Subsequent to forming an even dispersion of gum and lactose in the water fraction, the gum dispersion is added to melted butter or another liquefied fat having been heated to a temperature sufficient to make the fat fluid, such as about 104° F.

Dry cream may be mixed in another portion of the water along with one or more of a defoamer (e.g., food grade defoamers such as Magrabar silicone defoamer); potassium sorbate; citric acid; sodium caseinate and whey protein concentrate using the liquefier to form a cream pre-mixture. The dry cream component in the cream pre-mixture may hydrate with the water portion to form a cream. Sodium caseinate added to the cream pre-mixture may bind fat to any available water in the cream pre-mixture and may serve to emulsify the fat and available water.

The cream pre-mixture may be added to the mixture of the gum dispersion and the butter to form a cream mixture. As with the gum dispersion, the gum in the cream mixture may stabilize any available water that is not used by the other components of the cream mixture, thereby preventing syneresis or water exiting the mixture and providing a stable product. In some implementations, the sodium caseinate in the cream mixture emulsifies fat and water. With the water stabilized by the gums, and the fats bound to the water by the sodium caseinate, a stable product may be produced.

In some implementations, the cream pre-mixture may be mixed with the gum dispersion prior to their addition to the melted butter to form the cream mixture.

The cream mixture may be pasteurized by heating to about 165° F. for at least one minute. In some implementations, the cream mixture may be heated to about 155° F. for 30 minutes. In yet further implementations, the mixture may be heated between 150° F. and 185° F. for a time ranging between 1 minute and 30 minutes, for any integer time value between 1 minute and 30 minutes, or for any integer-bounded time range falling between 1 minute and 30 minutes. The cream mixture is generally heated to a temperature sufficient to prevent whipping and churning when agitation is applied later in the process. A sufficient temperature for the mixture is about 100° F. The mixture may be heated in a cook kettle or other vessel such as a double boiler or a steam jacketed vessel that do not add moisture to the cream mixture.

The cream mixture may be filtered to remove any particulates from the cream mixture, such as by using a ¼" in-line screen. The mixture is then homogenized. Preferably, the cream mixture is homogenized at between about 500 psig and 2000 psig or at about 1000 psig through a single stage homogenizer, which may provide a consistent, stable cream product. However, homogenization with a multiple stage homogenizer is also within the scope of the present invention. For example, a double stage homogenizer may homogenize the cream mixture at 1000 psig and then at 500 psig.

The mixture exiting the homogenizer may be at a temperature of between about 110° F. and 150° F. and the homogenized cream mixture may be subjected to a rapid cooling and shear step. For example, the mixture may be transferred to a cooler such as a scraped surface heat exchanger. The cooler cools the mixture to a temperature range of between about 40° F. and 70° F. and preferably to a temperature range of between about 65° F. and 70° F. Subjecting the mixture to rapid cooling and shear may enable the gums in the gum dispersion within the cream mixture to reach their full water binding capacity. Without this processing, the gums in the mixture may not adequately bind with the water.

The cooled cream mixture may form a cream product that may be transferred to a holding vessel and maintained at temperature of between about 65° F. and 70° F. and agitated, such as using a hold kettle. The cream product may be processed to remove any impurities by, for example, filtering, using an in-line magnet to remove any metals from the product and so on. The product is then packaged into a desired container, such as by using a pouch filler with a surge tank, and the containers may be stored in a refrigerated environment. The packaged cream product may be used in the food industry as a cream product, such as a reduced heavy cream substitute.

Cream products produced using certain methods above in which the cream mixture is pasteurized at higher temperatures, e.g., to 165° F. and up to about 185° F., may be produced with a higher throughput compared to other cream production methods because the higher temperature level pasteurizes the cream mixture at a faster rate, such as within about 1 minute.

The cream products provided herein are formulated to be highly stressed in cooking situations such as in food service applications due to the ability of the product to withstand abuses. For example, reduced heavy cream products having the compositions or produced according the methods provided herein may withstand cooking temperatures above 140° F., whereas traditional (scratch) reduced heavy creams break or oil off at temperatures above 140° F. Further, the cream product performs substantially similarly to traditional reduced heavy creams in relation to flavor, appearance, and texture; and provides the additional benefit of being more robust than the traditional reduced heavy creams.

The reduced heavy cream products herein provide additional benefits of having a shelf life of about six months, and up to about nine months, which is a significant improvement over the two week shelf life of traditional (scratch) reduced heavy creams produced using liquid cream. The reduced heavy cream products may include a viscosity and thickness substantially the same as that of traditional reduced heavy cream, but may have a fat content of about 15 percent to about 35 percent, and preferably between about 17 percent and 20 percent, which is a lower fat content compared to the 60 percent fat content of traditional reduced heavy cream and the 40 percent fat content of traditional liquid cream-based creams. Because the reduced heavy cream products are formed of dry cream, as opposed to non-dairy ingredients, the product has the added benefit of its ability to be labeled with cream as the first ingredient. In some implementations, the butter in the cream mixture may break down into cream, thereby adding an additional cream component to the cream mixture.

The following Example is illustrative and not intended to limit the embodiments.

Example

In a plant trial, a 3000 lb. batch of reduced heavy cream was processed and packaged so that further testing could be done on the finished product. At the time of testing, the samples had been stored for approximately one month.

The composition of the reduced heavy cream included about 5.0 weight percent dry cream, about 20.0 weight percent butter, up to 1 percent gum, up to 3 percent lactose, and about 70 weight percent water with the balance being a combination of emulsifiers, edible acids, protein sources, and preservatives.

The reduced heavy cream product was produced by the following method. Dry blended Kelgum 87 and lactose were added to water and heated to 140° F. The mixture was agitated during heating. Gums dispersed within a few minutes, and the mixture of gum, lactose and water appeared to have a gel consistency. The water in the gel dispersion contributed 57 percent of the total weight of the final product. Upon forming a gum dispersion, the heated and agitated mixture was blended in a liquefier and added to melted butter in a cook kettle. The balance of the water along with the dry cream, defoamer, potassium sorbate, sodium caseinate, citric acid and whey protein concentrate were heated to 140° F. and agitated to form a cream pre-mixture. The cream pre-mixture was transferred to the liquefier for blending and was added to the cook kettle containing the melted butter and gum dispersion to form a cream mixture. The cream mixture was heated to 165° F. for 1 minute and then subjected to a single stage homogenizer at 1000 psig. The homogenized cream mixture was rapidly cooled and agitated in a scraped surface heat exchanger to a temperature of 65° F. to 70° F. and transferred to a hold kettle. The cream product was packaged for testing.

The testing included: performance testing (e.g., viscosity and color testing), test kitchen evaluation (e.g., operator use), and shelf life. Overall, the trial product tested well in all applications and uses. It also scored well in the operator use test when compared against competitor products and scratch reduced heavy cream.

Performance Testing

Viscosity. Samples were run on a Brookfield viscometer, spindle #5 at 20 rpm for 9 seconds. At an initial temperature of 39.8° F., the reduced heavy cream product had a viscosity of 8720 cP. After two hours the sample had a temperature of 154° F. and had a viscosity of 2500 cP. After four hours, the sample had a temperature of 154.9° F. and a viscosity of 2300 CP. The viscosity results show that as heat is applied to the product, the reduced heavy cream product becomes thinner, yet stays consistent at a viscosity level that is conducive with a foodservice operator's needs for dish preparation. The viscosity data also shows that the make process is properly incorporating the gums in the formula and stabilizing the product for optimum performance.

Colorimeter. Samples were run on a Hunter colorimeter with L, a, and b outputs. The L values range from 0 (all black) to 100 (all white), a values corresponding to a position on the a axis, and ranging from −128 (green) to 127 (red), and b values corresponding to a position on the b axis, and ranging from −128 (blue) to 127 (yellow). At an initial refrigerated temperature, the sample had the following values: L=94.4; a=−2.06, and b=11.20. After four hours at 165° F., the sample had the following values: L=93.61; a=−2.50; and b=12.19. The colorimeter data shows that there is a minimal, yet desired change in the product from refrigeration temperature (just opened) to 165° F. held for four hours. The L a b values indicate a slight browning during the hold time (desired), but not an overbrowning (undesired). In addition, the reduced heavy cream replacers provided herein includes a similar color to scratch reduced heavy cream at both the initial refrigerated temperature and after holding at 165° F. for four hours.

Test Kitchen Evaluation

Kitchen testing was performed by a professional chef and included tests such as direct heat testing (stovetop; oven; broiler); indirect heat testing (double boiler); microwave heat testing; and steam table testing (holding test). The tests results showed acceptable results with little or no oiling display that the reduced heavy cream product holds up to potential abuses the product may incur when used in a foodservice environment. For example, reduced heavy cream products having the compositions or produced according the methods provided herein may withstand cooking temperatures above 140° F., whereas traditional reduced heavy creams break or oil off at temperatures above 140° F. Evaluations of flavor showed the product had a cooked cream and dairy notes. The appearance was characterized as white, and the texture was characterized as having a clean finish. The flavor, appearance and texture evaluations, verify that the product would be found acceptable to foodservice operators. Further, the results show that the product passed all abuses and is thereby formulated to be highly stressed in cooking situations such as in food service applications, which is an improvement to traditional (scratch) reduced heavy creams. Accordingly, the cream products provided herein may have a flavor, appearance, and texture similar to and thus the reduced heavy cream product may perform substantially similarly to their traditional cream product counterparts, but may additionally withstand stresses and abuses that are not tolerated by the traditional cream product counterparts.

Shelf life. The reduced heavy cream samples were stored for five months in a refrigerated environment and subjected to viscosity, colorimeter and kitchen testing. The viscosity testing showed the stored product at an initial temperature of 43.2° F., had a viscosity of 9520 cP (centipoise). After two hours the sample had a temperature of 157° F. and had a viscosity of 2460 cP. After four hours, the sample had a temperature of 160° F. and a viscosity of 2460 cP. The colorimeter testing showed the stored product at an initial refrigerated temperature had the following values: L=94.58; a=−2.02, and b=11.24. After four hours at 165° F., the stored sample had the following values: L=93.30; a=−2.46; and b=12.28. The shelf life testing results show that after five months of age, the reduced heavy cream product is found to be acceptable and exhibits similar viscosity and color attributes as when it was first made. This further shows that the formula and process are robust and delivers a stable and versatile product that can be used in place of scratch reduced heavy cream, which has a shelf life of only about two weeks.

Although the present disclosure provides references to preferred embodiments, persons skilled in the art will recognize that changes may be made in form and detail without departing from the spirit and scope of the invention.

What is claimed is:

1. A method for producing a pasteurized cream product comprising:
    forming a gum dispersion consisting of gum, lactose and a first portion of water by mixing the gum and the lactose with the first portion of water for a first time period, wherein the gum dispersion is free of protein;
    after the first time period, combining the gum dispersion with melted butter;
    forming a cream pre-mixture by hydrating dry cream in a second portion of water;
    mixing the cream pre-mixture with the combined melted butter and gum dispersion thereby forming a cream mixture;
    heating the cream mixture to a pasteurization temperature;
    cooling the heated cream mixture to below 70° F. while subjecting the heated cream mixture to shear forces such that the gum binds the first and second portions of water in the cream mixture;
    wherein the gum dispersion in the cream mixture subjected to the cooling and the shear forces forms a stable cream product.

2. The method of claim 1, wherein heating the cream mixture comprises heating to about 165° F. for at least one minute.

3. The method of claim 1, wherein heating the cream mixture comprises heating to about 155° F. for about 30 minutes.

4. The method of claim 1, wherein the gum dispersion is heated to about 140° F. prior to adding to the melted butter.

5. The method of claim 4, wherein the cream pre-mixture is heated to about 140° F. prior to adding to the gum dispersion and the melted butter.

6. The method of claim 1, wherein a scraped surface heat exchanger cools and subjects the cream mixture to the shear forces.

7. The method of claim 1, further comprising homogenizing the heated cream mixture prior to rapidly cooling.

8. The method of claim 7, wherein the heated cream mixture is subjected to a single stage homogenization between about 500 and 2000 psig.

9. The method of claim 8, wherein the single stage homogenization is at about 1000 psig.

10. The method of claim 1, wherein the stable cream product has a shelf life of about six months.

11. The method of claim 1, wherein the dry cream is derived from a milk skimming and drying process.

12. The method of claim 1, wherein the gum comprises at least one of xanthan gum and guar gum.

13. The method of claim 1, wherein the stable cream product further comprises at least one of an emulsifier, an edible acid, and a protein source.

14. The method of claim 1, wherein a viscosity of the stable cream product is substantially the same after storage for about five months compared to after storage for about one month.

15. The method of claim 1, wherein a color of the stable cream product is substantially the same after storage for about five months compared to after storage for about one month.

16. The method of claim 1, wherein forming the cream pre-mixture further comprises adding sodium caseinate to the dry cream and the second portion of water.

17. The method of claim 1, wherein the stable cream product comprises about 5 weight percent dry cream.

18. The method of claim 1, wherein the stable cream product comprises up to about 35 weight percent fat.

19. The method of claim 1, wherein the stable cream product withstands cooking temperatures above 140° F.

* * * * *

UNITED STATES PATENT AND TRADEMARK OFFICE
CERTIFICATE OF CORRECTION

Page 1 of 1

PATENT NO. : 9,119,412 B2
APPLICATION NO. : 13/420363
DATED : September 1, 2015
INVENTOR(S) : Thompson It is certified that error appears in the above-identified patent and that said Letters Patent is hereby corrected as shown below:

SPECIFICATION

| Column | Line | Delete | Insert |
|---|---|---|---|
| 6 | 30-31 | "viscosity of 2300 CP." | -- viscosity of 2300 cP. -- |

Signed and Sealed this
Fifteenth Day of March, 2016

Michelle K. Lee
*Director of the United States Patent and Trademark Office*